United States Patent Office 2,787,126
Patented Apr. 2, 1957

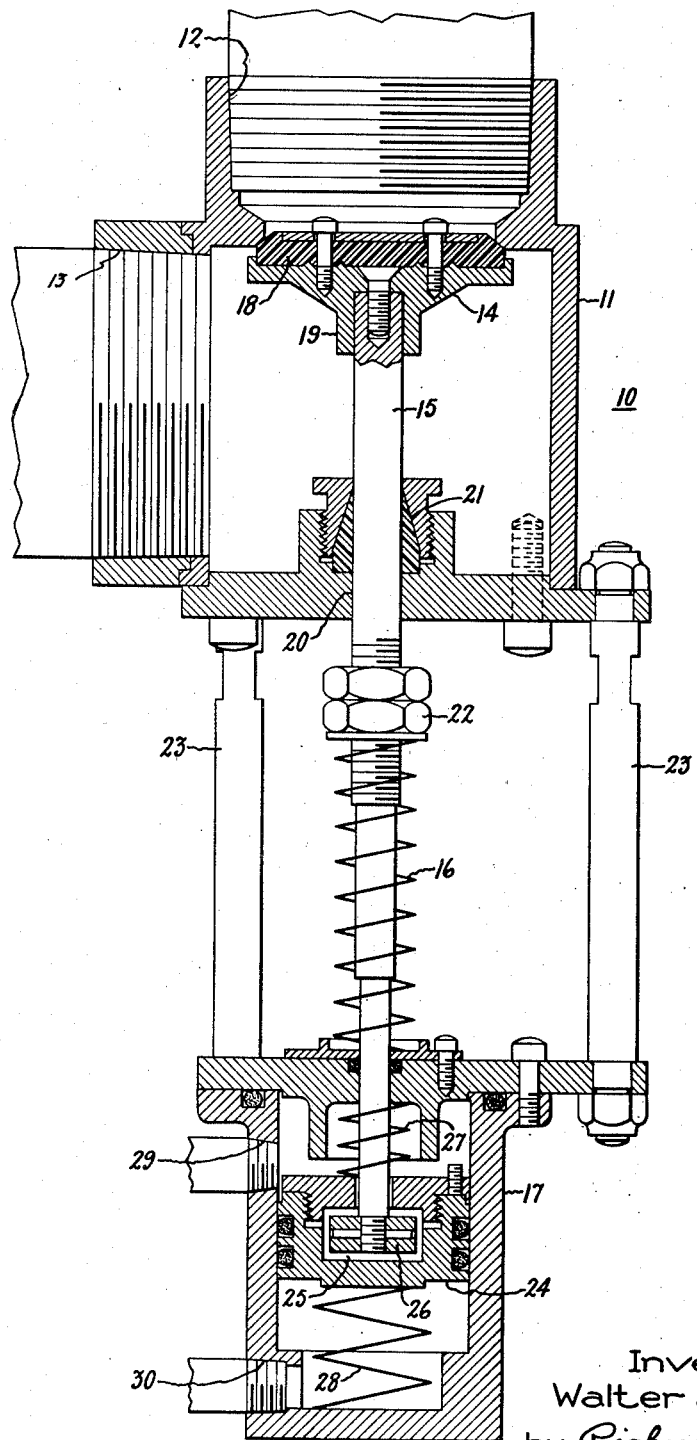

2,787,126
HYDRAULICALLY OPERATED VALVES

Walter S. Kleczek, Schenectady, N. Y., assignor to General Electric Company, a corporation of New York Application December 29, 1952, Serial No. 328,311

5 Claims. (Cl. 62—1)

This invention generally relates to relief valves, and more particularly to such valves employed in the storage and transit of low temperature fluids under predetermined pressure.

The handling of low temperature fluids, such as liquefied gases, while maintaining them under predetermined pressures generally entails difficulties due to the very low temperatures and high vapor pressures encountered. While filling containers with these fluids, for example, suitable remotely operated venting means, such as vent valves, are generally provided to avoid the establishment of back pressures inasmuch as the liquefied gases occupy only approximately one-thousandth the volume of the fluid in its gaseous state. However, the extremely low temperatures of these fluids often result in freezing of the venting means in open or closed position, or otherwise clogging of the vent opening by the formation of ice thereon. Similarly, in storing these low temperature fluids under predetermined pressures during relatively long intervals of time and in transferring these fluids from one place to another by means of conventional vent and relief valves, difficulties arise, for the extremely low temperature of the fluid may either cause ice formation about the relief valve and valve seat resulting in improper seating of the valve and the leakage of gases therethrough, or freeze the valve to its seat rendering the valve inoperative to provide overpressure relief, or so vary the characteristics of the valve moving parts, such as the control spring constant, as to vary the desired pressure in the system. Accordingly, in systems for the handling of liquefied gases, prior valves and plumbing being subject to these defects, have generally been considered unsatisfactory.

The present invention pertains to a vent and relief valve, which though not necessarily limited to the handling and storage of liquefied gases, is so constructed as to either eliminate or compensate for the low temperature and high pressure effects produced thereby and enumerated above. In accordance with one embodiment of this invention, the features enabling this improved operation comprise a valve chamber for controlling the passage of low temperature fluids therethrough which is denuded of all moving parts with the exception of a valve and a portion of the valve stem; a control spring thermally isolated from the valve chamber so as to be unaffected by the low temperature fluid and cooperating with the valve stem to provide overpressure relief; and an actuator, also thermally isolated from the chamber, for enabling the independent opening or closing of the valve by remote means. The latter actuator being hydraulically operated and including a lost motion connection with the valve stem to thereby provide an efficient means for de-icing the valve and valve seat, or freeing a sticky valve, while imposing little additional friction impeding overpressure relief operation thereof as will be more fully disclosed hereinafter.

It is, accordingly, one object of this invention to provide a relief valve including a separate remotely operable hydraulic actuator.

Another object of this invention is to provide a relief valve for maintaining the pressure of a body of low temperature fluids constant.

A further object of this invention is to provide a relief and vent valve for maintaining the pressure of low temperature fluids constant over a long period of time.

A still further object of this invention is to provide a relief and vent valve remotely freeable after being frozen.

Other objects and many attendant advantages will be more clearly comprehended from the following detailed description of one preferred embodiment of the present invention taken in conjunction with the accompanying drawing in which:

Fig. 1 is an elevational view, in section, of a vent and relief valve in accordance with the present invention, illustrating the valve in normal seated position.

Referring now to the drawing for a detailed consideration of one preferred embodiment of the present invention, a valve designated 10 generally comprises an upper valve chamber 11 for receiving the passage of liquefied gases therethrough between suitably disposed inlet and outlet ports 12 and 13 by means of the opening or closing of a valve member 14 mounted upon an elongate stem 15; a control spring 16 remotely situated from the chamber and cooperating with valve stem 15 to enable the valve chamber 11, valve 14, and stem 15 to operate as a relief valve; and an actuator 17 physically separated from chamber 11 and associated with valve stem 15 for enabling the independent opening and closing of valve 14 in response to remotely controlled hydraulic pressures.

Within valve chamber 11 the vertically disposed inlet port 12 and horizontally disposed outlet port 13 may both be threaded, as shown, to engage suitable plumbing forming passages for the liquefied gases to and from the valve. Intermediate these ports and adapted to be normally seated below inlet port 12 to block the passage of fluids therethrough is positioned a valve member 14, preferably formed in disk shape and including a flat base portion for receiving a disk-like seating 18 of Teflon or other suitable material, and a vertically depending hollow cylinder like portion 19 formed integral therewith to rigidly receive one end of the elongate valve stem 15. Valve stem 15 projects through a suitably aligned opening 20 in the base of valve chamber 11, and a fluid tight movement is permitted into and out of the cylinder by means of a packing 21 of Teflon or other suitable material properly arranged therein to insure against the leakage of fluids therethrough.

For enabling the operation of valve 10 as a relief valve, a control spring 16 is concentrically arranged about a portion of elongate valve stem 15 extending vertically below and separated from valve chamber 11; and by exerting pressure against a stop 22 provided on stem 15, spring 16 normally urges valve member 14 to its seated position below inlet port 12. As shown, stop 22 is preferably comprised of an adjusting nut and lock nut threaded upon the valve stem 15 and therefore the spring force urging valve member 14 against its seat may be adjusted by varying the position of these nuts on valve stem 15.

Vertically disposed below cylinder 11 and separated therefrom by means of support rods 23 of stainless steel or other material of low thermal conductivity, is positioned a hollow actuating cylinder 17 for enabling the independent opening and closing of valve member 14. A piston 24, having a cavity 25 thereon for receiving a flanged end portion 26 of valve stem 15, is free to ride up and down within the cylinder. Vertical movement of piston 24 in either direction within cylinder 17 causes the inner sides of the piston cavity to engage the flange faces of valve stem 15 and move it therewith. However, inasmuch as the piston cavity 25 is purposely made larger than the valve stem, there exists a lost motion clearance therebetween enabling valve stem 15 to ride upwardly or downwardly short distances when performing over-pressure relief functions before contacting the piston cavity sides. This latter feature prevents piston 24 from exerting a drag upon the free movement of valve stem 15 and therefore permits unhampered operation of valve member 14 during the normal performance of these relief functions.

For centrally biasing piston 24 normally out of contact with flange 26 of valve stem 15, two centering springs 27 and 28 are provided within the cylinder, one positioned above the piston and urging it away from the top of the cylinder, and the other positioned below the piston and urging it away from the bottom of the cylinder. Movement of the piston in either direction away from its centrally biased position 15 is provided by exerting hydraulic pressure on one or the other of the piston surfaces, such as by introducing into the cylinder fluid under pressure through suitably provided pressure ports 20 and 30 positioned respectively above and below the biased position of piston 24.

Now considering the operation of this valve for an understanding of its utility in the handling of low temperature fluids; when the pressure of the fluid entering the inlet port 12 upon the valve face exceeds the control spring force urging the valve against its seat, the valve opens to function as a relief. Similarly, should venting of the fluid tank (not shown) be desirable, the valve may be remotely opened by introducing suitable pneumatic pressure through actuator pressure port 29 to drive piston 24 downwardly moving valve stem 15 and valve 14 therewith. Similarly, the remote closing of valve 14 may be performed by withdrawing the pressure exerted upon the top of piston 24 through actuator port 29 and enabling the control spring 16 and biasing springs 27 and 28 to return the valve to its seated position and the piston to its biased position; or more rapidly performed by introducing suitable pneumatic pressure against the bottom surface of piston 24 through lower pressure port 30. Inasmuch as a lost motion connection exists between the actuator piston and the valve stem, the actuator supplies no drag normally impeding the valve member and stem during small movements thereof in the performance of overpressure relief functions. Now assuming that the low temperature fluid in contact with the valve member and its seating forms ice thereon, freezes the same, or otherwise hinders the normal opening and closing of the valve, energization of the actuator by effecting a rapid reversal of pneumatic pressures through the upper and lower actuator pressure ports 29 and 30 oscillates the actuator piston 24 with reciprocating motion. Each short movement of the piston in either direction enables the sides of the piston cavity to strike a hammer-like blow against the flange of the extended valve stem, resulting in a rapid jarring of the valve against its seat and away therefrom. This rapid jarring effectively breaks any frozen connection therebetween or similarly chips away any ice formation thereon enabling free and unhindered seating and unseating of the valve member thereafter. Thus the lost motion connection existing between the actuator and valve stem additionally enables efficient defreezing or deicing of the valve by providing an oscillatory hammering means for sharply joining free a frozen valve or iced valve seat in response to remotely controlled pressures.

Although the above described valve is illustrated as comprising vertically moving members, coil springs for control and biasing, support rods for separating and thermally isolating the valve chamber and actuating cylinder, and many other incidental features performing necessary functions, it is to be understood that these specific parts and the arrangement thereof, just as the materials they are comprised of, are merely illustrative of one embodiment of the invention and that many changes therein may be readily made by those skilled in the art in accordance with the basic invention. Accordingly, this invention is to be limited only in accordance with the basic features as set forth in the claims appended hereto.

What I claim as new and desire to secure by Letters Patent of the United States is:

1. In a relief valve for maintaining low temperature fluids under predetermined pressures a closed valve chamber having an inlet and outlet opening for the passage of fluids therethrough, a movable valve member positioned within said chamber intermediate said openings and adapted to seat therein for controlling the passage of fluids through the chamber, an enlongated stem having a portion extending without said chamber for positioning said valve member, a control spring thermally-isolated from said chamber and associated with said stem portion for normally urging the valve in seated position, and a hydraulically operating actuator thermally isolated from said chamber and associated with said stem portion for enabling remote opening and closing of said valve, by pneumatic pressures remote from said valve, said actuator having a lost motion connection with said stem enabling the remote deicing and defreezing of said valve from its seat by a reciprocatory hammering action while providing no drag upon the small movements of said valve and stem when operating as an overpressure relief against the bias exerted by said control spring.

2. In a relief valve for maintaining low temperature fluids under predetermined pressures, a closed valve chamber having an inlet and outlet opening for the passage of fluids therethrough, a valve member and seating means therefor within said chamber for controlling the passage of fluids therethrough, an elongated spring-pressed stem associated with said valve and having an extended portion projecting through said chamber, a closed hydraulic cylinder externally spaced from the valve chamber and having inlet and outlet pressure ports and an opening to receive said extended valve portion, a piston slidably movable within said cylinder intermediate said ports and engaging said extended stem portion by a lost motion connection, whereby alternative actuation of said piston by pneumatic pressure through said ports results in a hammering of said valve against its seat to thereby effectively defreeze and deice the same, and spacing means interconnecting said chamber and actuator and providing thermal isolation therebetween.

3. In a relief valve for maintaining low temperature fluids under predetermined pressures, a closed valve chamber having an inlet and outlet opening for the passage of fluids therethrough, a valve member and seating means therefor within said chamber for controlling the passage of fluids therethrough, an elongated spring-pressed stem associated with said valve and having an extended portion projecting through said chamber, and a reciprocating hydraulic actuator external to said chamber and associated with said stem portion for independently operating the valve in response to pneumatic pressures, means for providing hydraulic fluid to said actuator for actuating the actuator and stem portion thereby enabling the defreezing and the deicing thereof by rapidly actuated blows, said actuator being associated with said stem portion through a short displacement lost-motion connection, and balancing spring means for normally biasing said actuator out of contact with the stem when the valve is seated.

4. An over pressure relief valve comprising a valve body having an inlet conduit and an outlet conduit, a valve seat in said valve body, a valve in the valve body adapted to seat on the valve seat, a stem extending from said valve through the valve body and terminating in a flanged end portion, spring means outside of said valve body normally urging said valve to its normally seated position, a piston on the flanged end portion of the valve stem for movement in a cylinder, a source of fluid pressure acting on each side of said piston for moving the valve, lost motion means between said piston and valve stem, said lost motion means including a piston cavity in the piston for receiving the flanged end portion of the stem, the flanged end portion being spaced from the upper and lower portions of the piston cavity so as to permit movement of the valve when the pressure in the inlet conduit is sufficient to overcome said spring means.

5. An over pressure relief valve comprising a valve body having an inlet conduit and an outlet conduit, a valve seat in said valve body, a valve in the valve body adapted to seat on the valve seat, a stem extending from said valve through the valve body and terminating in a flanged end portion, spring means outside of said valve body normally urging said valve to its normally seated position, a piston on the flanged end portion of the valve stem for movement in a cylinder, a source of fluid pressure acting on each side of said piston for moving the valve, lost motion means between said piston and valve stem, said lost motion means including a piston cavity in the piston for receiving the flanged end portion of the stem, the flanged end portion spaced from the upper and lower portions of the piston cavity so as to permit movement of the valve when the pressure in the inlet conduit is sufficient to overcome said spring means and balancing means for normally biasing said piston out of contact with the flanged end portion.

References Cited in the file of this patent
UNITED STATES PATENTS

| | | |
|---|---|---|
| 740,882 | Locke | Oct. 6, 1903 |
| 1,131,020 | Wadsworth | Mar. 9, 1915 |
| 1,175,621 | Ekberg | Mar. 14, 1916 |
| 1,571,401 | Erickson | Feb. 2, 1926 |
| 1,861,742 | Hand | June 7, 1932 |
| 2,200,226 | Larson | May 7, 1940 |
| 2,413,542 | Butts | Dec. 31, 1946 |
| 2,635,627 | McCarthy | Apr. 21, 1953 |